United States Patent Office 3,405,981
Patented Oct. 15, 1968

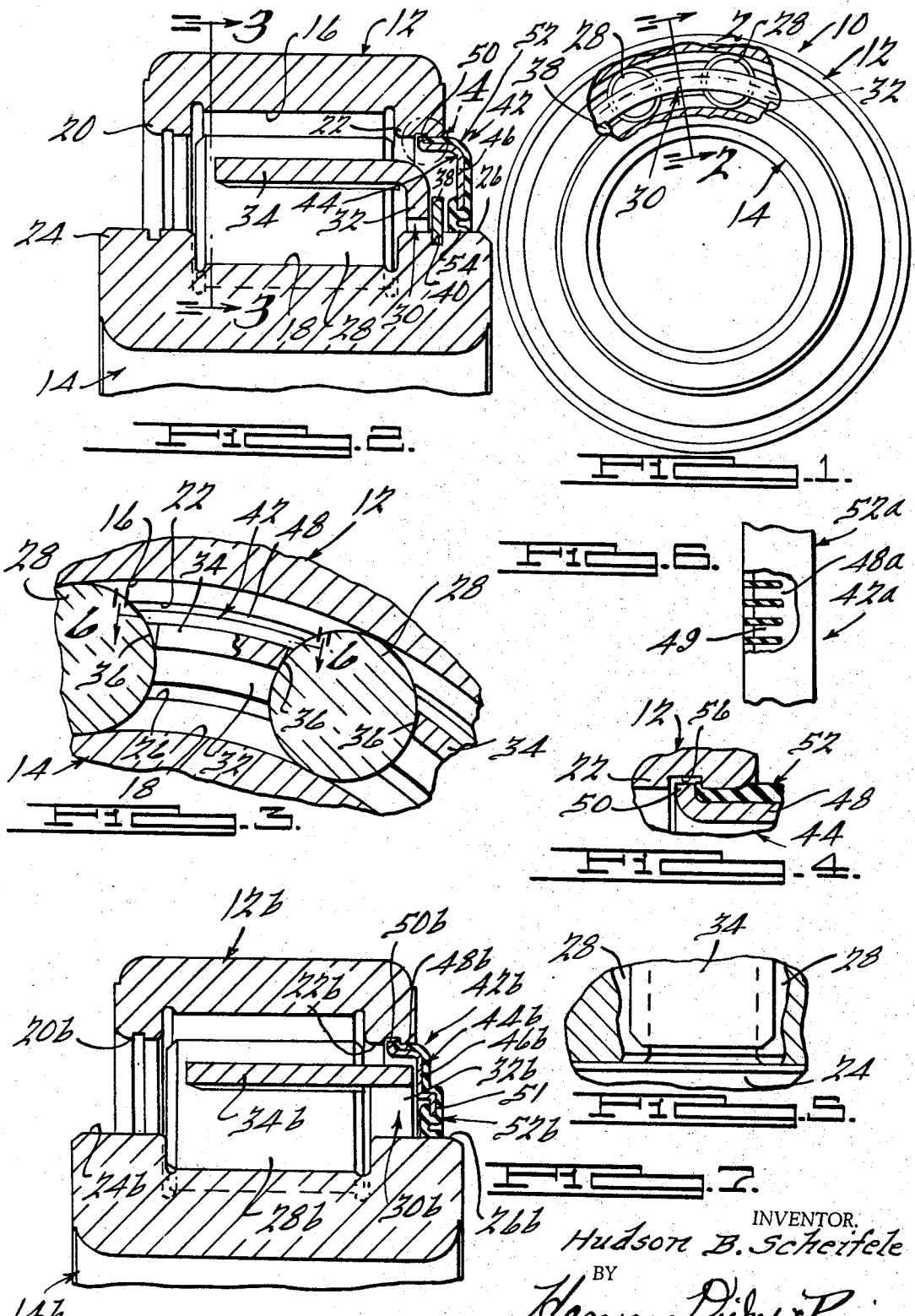

3,405,981
CAGE AND BEARING ASSEMBLY
CONSTRUCTION
Hudson B. Scheifele, Franklin, Mich., assignor to Federal-Mogul Corporation, a corporation of Michigan
Filed June 28, 1966, Ser. No. 561,274
18 Claims. (Cl. 308—213)

ABSTRACT OF THE DISCLOSURE

A bearing assembly construction having a finger type cage and a separate retaining member for axially retaining the cage.

---

The present invention relates to a bearing assembly construction and to the construction of the cage for retaining the roller members.

It is desirable to have a cage which can be quickly assembled onto the rollers; one such cage is of a finger type construction which is open at one end and which has a plurality of pockets defined by a plurality of fingers. However, with such a construction some means must be provided to axially restrain the cage from moving off the rollers. In some constructions the ends of the fingers are bent or deformed either before or after assembly of the cage to the rollers to cause an interference with the rollers whereby the cage is axially held. In such constructions there is a tendency for the cage to be distorted when the fingers are bent or if they are prebent to distort upon assembly. In the present invention the cage is axially held by means secured to one of the race members. Note that bending of the fingers either before or after assembly tends to complicate the assembly process, whereas in the present invention a simple, direct means of assembly is provided.

Finger type cages, in past constructions, have been race guided. Such a race guided structure is inherently unbalanced as a result of the fingers extending outwardly from the supporting flange or ring portion and, hence, there will be a tendency for the cage to skew resulting in high frictional forces at the cage-race guiding surface. If the cage is constructed to be roller-race guided, it is possible that the force of the rollers approaching each other in the load zone will move the cage radially producing a frictional force at the cage-race guide surface. This radial motion can be accommodated with the cage construction shown in this application which is not race guided. In view of the above, it is a general object of the present invention to provide an improved bearing assembly construction.

It is another object of the present invention to provide an improved bearing cage construction.

It is a further object of the present invention to provide an improved bearing assembly having a novel cage and means for retaining the cage onto the rollers.

In one form of the invention an annular seal is utilized to perform a sealing function as well as to axially retain the cage. Therefore, it is another object of the present invention to provide a novel bearing assembly having a finger type cage which is axially retained by a member which performs a sealing function.

Other objects, features, and advantages of the present invention will become apparent from the subsequent description and the appended claims, taken in conjunction with the accompanying drawings, in which:

FIGURE 1 is a front elevational view with some parts shown broken away of a bearing assembly embodying features of the present invention;

FIGURE 2 is a sectional view, to increased scale, of the assembly of FIGURE 1 taken substantially along the line 2—2 in FIGURE 1;

FIGURE 3 is a sectional view taken along the line 3—3 in FIGURE 2;

FIGURE 4 is a fragmentary view to increased scale generally of that portion of the assembly shown in FIGURE 2 and in the circled area designated by the numeral 4;

FIGURE 5 is a sectional view taken along the line 6—6 in FIGURE 3;

FIGURE 6 is a fragmentary view with some parts broken away of a modified form of seal; and FIGURE 7 is a sectional view similar to that of FIGURE 2 depicting a modified form of the assembly shown in FIGURE 2.

Looking now to the drawing in FIGURE 1, a bearing assembly is generally indicated by the numeral 10 and includes an outer race 12 and an inner race 14. The races 12 and 14 are provided with annular raceways 16 and 18, respectively. Outer race 12 has a pair of annular shoulders 20 and 22 while inner race 14 has a pair of annular shoulders 24 and 26. A plurality of straight rollers 28 are located in the raceways 16 and 18 and are separated one from another by a cage 30. The cage 30 has an annular generally radially extending flange portion 32 from which a plurality of fingers 34 axially extend. Adjacent ones of the fingers 34 define pockets to receive the rollers and are spaced apart from each other a distance generally less than the diameter of the rollers 28 whereby the fingers 34 will be located radially outwardly of the roll circle of the rollers 28. At the same time the flange portion 32 is constructed to clear the shoulder 26 of the inner race 14 sufficiently such that the cage 30 will be supported upon and guided upon the rollers 28. The edges 36 of the fingers 34 are generally tapered to provide a good bearing surface with the rollers 28. Note that the fingers 34 are not axially bent and extend between adjacent rollers 28 without interference with the rollers 28 and, hence, the cage 30 is free to be moved axially into and out of engagement with the rollers 28; this feature facilitates the assembly of the cage 30. In order to axially retain and guide the cage 30, a snap ring or retaining ring 38 is located in an annular groove 40 in the shoulder 26 and is located proximate to and is engageable with the flange portion 32. By providing a clearance between the flange portion 32 and the shoulder 26 and by locating the fingers 34 above the roll circle of the rollers 28, the cage 30 is positively guided and supported by the rollers 28. The retailing ring 38 is located at a point of minimum clearance with, and hence very close to, the flange portion 32 of cage 30; the ring 38 will guide the cage 30 in its radial excursions by engaging the flange portion 32, and hence, minimize skewing and eliminate damage thereby. In this way the fingers 34 are maintained in proper alignment and the cage 30 will not skew. Thus, since there is no interference between the fingers 34 and rollers 28, i.e., no tabs or portions of the fingers 34 to be bent or to be moved into interference with the rollers 28, distortion of the cage 30 is precluded. At the same time it is a simple matter to axially retain the cage 30 to the rollers 28 by insertion of the snap ring 38 within the groove 40.

In some applications it is desirable that the bearing assembly 10 be sealed at least at one end. A seal 42 is located between the shoulder 22 and shoulder 26 of the inner race 12 and outer race 14, respectively.

In the assembly 10, as shown in the drawings, the outer race 12 is of a relatively narrow width and, hence the seal 42 must be offset to extend between the confronting surfaces of the shoulders 22 and 26 while clearing the cage 30 and the retaining ring 38. The seal 42 has a generally cup-shaped core 44 which has a radially extending annular ring or flange portion 46 and an axially extending rim portion 48. The flange portion 46 has a central opening which clears the shoulder 26. At the same time the axially outer end of the rim portion 48 is turned radially outwardly to define a lip portion 50. The radially outer extremity of the lip portion 50 is of a diameter greater than the diameter of the shoulder 22. The member 44 is provided to be of a resilient material, such as steel to permit assembly. A rubber sealing member 52 extends over the outer surface of resilient core member 44 except for the radial extremity of the lip 50. However, the sealing member 52 on the rim portion 48 is of a thickness to extend substantially to the outer extremity of the lip portion 50. The sealing member 52 generally encloses the radially inner end of the flange portion 46 and has a sealing finger portion 54 which engages the shoulder 26. In assembly, the seal 42 is moved axially between outer race 12 and inner race 14. As a result of the interference between the lip portion 50 and the shoulder 22 the annular groove 56 receives the lip 50 to securely hold the seal 42 in place. At the same time, the rubber material of the seal member 52 at the radially outer surface of the rim portion 48 compressively engages the axially outer end of the shoulder 22 and provides a seal therewith. The finger portion 54 will compressively, resiliently engage the shoulder 26 to effectively seal the shoulder 26.

Note that the annular rim portion 48, as shown in FIGURES 1 through 4, is of a one-piece continuous ring construction. A modified form of the seal 42 is shown in FIGURE 6; in the description of the seal of FIGURE 6 components similar to like components of the seal 42 have been given the same number designation with the addition of the letter postscript *a*. In FIGURE 6 the seal 42*a* has its rim portion 48*a* formed with a plurality of fingers 49; the fingers 49 can flex and, hence, facilitate the assembly of the seal 42*a* onto the bearing races. Note, however, that the rubber coating of the sealing member 52*a* forms a continuous annular ring and, hence, a complete seal is provided.

FIGURE 7 shows a different assembly in which the retaining ring 38 is eliminated. In the description of the embodiment of FIGURE 7, components similar to like components in the embodiment shown in FIGURES 1 through 4 are given the same numerical designation with the addition of the letter postscript *b*.

Looking now to FIGURE 7, retainer 30*b* is generally of a straight cylindrical construction having a generally axially extending annular portion 32*b* from which the fingers 34*b* extend axially. Note that no flange, such as flange 32, is provided. Seal 42*b* has a resilient support member 44*b* which has a generally Z-shaped section and has a radially extending portion 46*b* which is located proximate to and in close clearance relationship with the annular portion 32*b* and is adapted to axially engage that portion whereby axial movement of the cage 30*b* is restrained and the cage 30*b* is guided during its radial excursions and skewing is minimized. The outer lip portion 50*b* serves generally the same function as that of the lip 50 in the seal 42 and the annular rim portion 48*b* can be constructed in a manner similar to that of the rim portion 48 of the seal 42 or of the modified rim portion 48*a*. A radially inner lip 51 terminates the resilient support 44*b* and the rubber coating of seal member 52*b* is located similarly to the seal member 52 on the seal 42 in that it generally extends over the axially outer surface of the support member 44*b* and has a finger portion 54*a* which provides a sealing effect with the shoulder 26*b*. Note, however, that with the construction of FIGURE 7, the retaining ring 38 can be eliminated and axial movement of the retainer 30*b* is restrained by the seal 42*b* and specifically by means of the engagement between the cage 30*b* and the ring portion 46*b* of the support member 44*b*. Also note that with the construction in FIGURE 7, the cage 30*b* can be of a simple construction.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a bearing assembly having a plurality of rollers assembled in a pair of race members, the improvement comprising: a cage for retaining the rollers, said cage comprising a plurality of axially extending fingers and annular connecting means connecting said fingers together at one end with said fingers being free at their opposite ends, adjacent ones of said fingers defining pockets for receiving the rollers with said fingers being spaced to axially receive the rollers from said opposite ends with no interference, said fingers being radially supported on the rollers with said cage being held out of contact with the race members and retaining means supported on one of the race members and engageable with said connecting means for axially retaining said cage on the rollers, means separate from said retaining means on opposite sides of the rollers for axially retaining the rollers with only a single row of rollers located therebetween.

2. The assembly of claim 1 in which said retaining means is a removable ring located in close clearance relationship with said cage whereby skewing of said cage is minimized.

3. The assembly of claim 1 with said connecting means comprising a flange portion extending radially toward that one of the race members and being engageable with said retaining means, said flange portion having a substantial clearance with that one of the race members whereby it is solely roll guided.

4. The assembly of claim 3 in which said retaining means is a removable ring located in close clearance relationship with said cage whereby skewing of said cage is minimized.

5. The assembly of claim 1 with the rollers being straight roller members and with each of said fingers being of a generally uniform width and with said fingers extending substantially axially parallelly to each other.

6. The assembly of claim 5 with said connecting means comprising a flange portion extending radially toward that one of the race members and being engageable with said retaining means, said flange portion having a substantial clearance with that one of the race members whereby it is solely roll guided.

7. The assembly of claim 6 in which said retaining means is a removable ring located in close clearance relationship with said cage whereby skewing of said cage is minimized.

8. The assembly of claim 7 including an annular seal located between the inner and outer races at said one end.

9. The assembly of claim 5 with said connecting means being an annular, straight, cylindrical connecting member extending generally directly axially from said fingers.

10. The assembly of claim 1 with said connecting means being an annular, straight cylindrical connecting member extending generally directly axially from said fingers.

11. The assembly of claim 1 with said retaining means comprising an annular seal located in close clearance relationship with said cage whereby skewing of said cage is minimized.

12. The assembly of claim 9 with said retaining means comprising an annular seal located in close clearance relationship with said cage whereby skewing of said cage is minimized.

13. The assembly of claim 11 in which said annular seal has a resilient support member made of a hard material and a flexible sealing member secured to said support member with said support member confronting and being engageable with said connecting means.

14. The assembly of claim 12 in which said annular seal has a resilient support member made of a hard material and a flexible sealing member secured to said support member with said support member confronting and being engageable with said connecting means.

15. The assembly of claim 13 with the race members each having a pair of shoulders and with said support member having a radially extending lip resiliently located in a groove in one of the shoulders of that one of the race members.

16. The assembly of claim 14 with the race members each having a pair of shoulders and with said support member having a radially extending lip resiliently located in a groove in one of the shoulders of that one of the race members.

17. In a bearing assembly having a plurality of rollers assembled in a pair of race members, the improvement comprising: a cage for retaining the rollers, said cage comprising only a single circumferential row of a plurality of axially extending fingers and annular connecting means connecting said fingers together at one end with said fingers being free at their opposite ends, adjacent ones of said fingers defining pockets for receiving the rollers with said fingers being spaced to axially receive the rollers from said opposite ends with no interference, said fingers being radially supported on the rollers with said cage being held out of contact with the race members and retaining means supported on one of the race members in close clearance relation with and engageable with said connecting means for axially retaining said cage on the rollers, means separate from said retaining means on opposite sides of the rollers for axially retaining the rollers with only a single row of rollers located therebetween.

18. The assembly of claim 17 with said fingers being radially supported on the rollers with said fingers and said connecting means out of contact with the race members and with said retaining means being a retaining ring located in a groove in one of the race members.

References Cited

UNITED STATES PATENTS

| | | | |
|---|---|---|---|
| 1,072,667 | 9/1913 | Smith | 308—218 |
| 1,397,226 | 11/1921 | Michand | 308—217 |
| 3,272,574 | 9/1966 | Tassowe et al. | 308—187.2 |

MARTIN P. SCHWADRON, *Primary Examiner.*

FRANK SUSKO, *Assistant Examiner.*